UNITED STATES PATENT OFFICE.

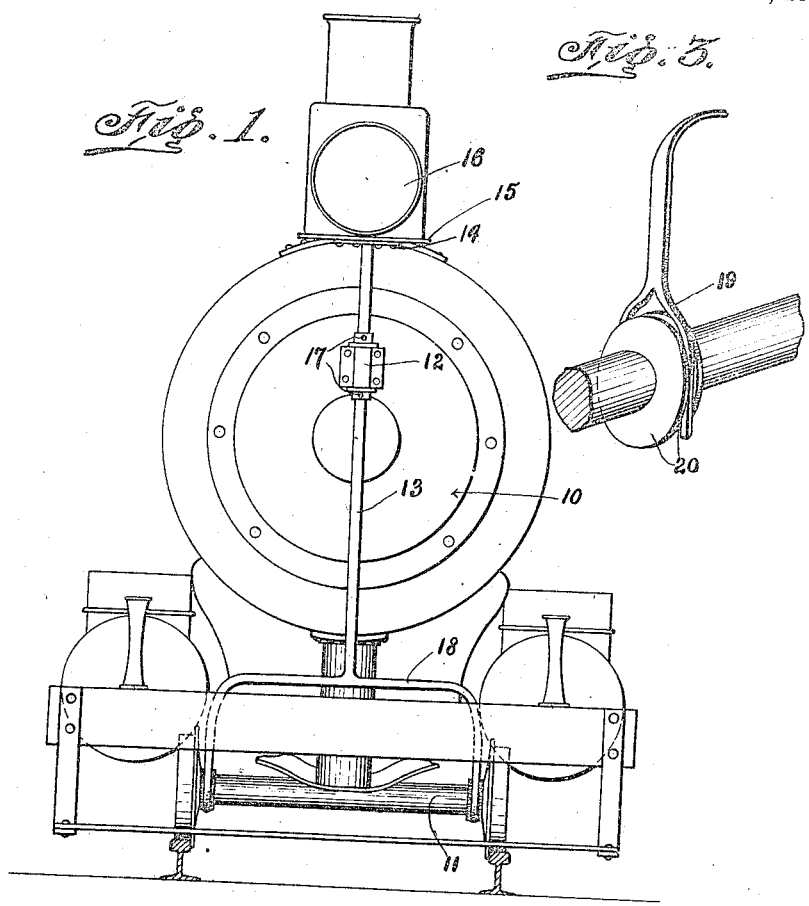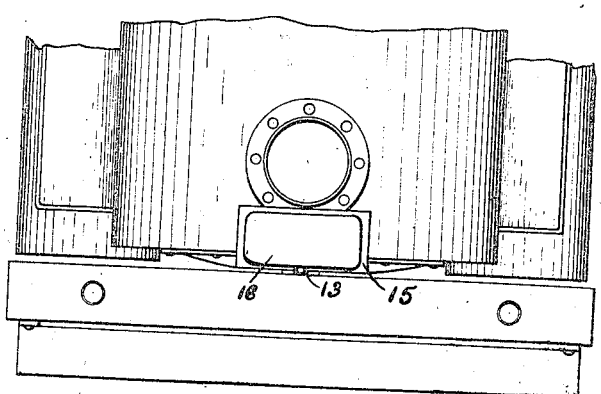

EPHRIAM B. POOLE, OF DELMAR, ALABAMA.

HEADLIGHT.

953,288. Specification of Letters Patent. Patented Mar. 29, 1910.

Application filed June 7, 1909. Serial No. 500,546.

*To all whom it may concern:*

Be it known that I, EPHRIAM B. POOLE, a citizen of the United States, residing at Delmar, in the county of Winston, State of Alabama, have invented certain new and useful Improvements in Headlights; and I do hereby declare the following to be a full, clear, and exact description of the invention, such as will enable others skilled in the art to which it appertains to make and use the same.

This invention relates to locomotives and has special reference to headlights for locomotives.

One object of the invention is to provide an improved form of headlight for locomotives in which the beam of light is constantly directed on the track no matter whether the locomotive be running on a tangent or curve.

Another object of the invention is to provide a device of this character connected directly to the front axle of a locomotive so that as this axle swings the beam of light will be kept constantly at right angles thereto.

With the above and other objects in view the invention consists in general of a rotatably supported headlight and an improved connection between the support and the front axle of a locomotive.

The invention further consists in certain novel details of construction and combinations of parts hereinafter fully described, illustrated in the accompanying drawings, and specifically set forth in the claim.

In the accompanying drawings, like characters of reference indicate like parts in the several views, and:—Figure 1 is a front elevation of an engine arranged in accordance with this invention showing the device applied. Fig. 2 is a top plan view of the axle and the device removed. Fig. 3 is a detail view of one of the forks and its connection with the axle.

The numeral 10 indicates the front sheet or smoke box door of an engine and at 11 is disclosed the front axle of an engine which may be either the axle of a bogie truck or the front axle of a four wheeled leading truck. Mounted upon the door 10 is a bracket 12 provided with a vertical perforation extending therethrough and through this bracket runs a shaft 13 provided with an enlarged head 14 whereon is mounted a platform 15 arranged to receive and hold a headlight 16. In order to retain the shaft 13 in its proper position within the bracket this shaft is provided on each side of the bracket with collars 17 which are pinned or otherwise attached thereto so that the shaft is held from longitudinal movement in the bracket. Upon the lower end of this shaft is a yoke 18 comprising a pair of outwardly extending arms downwardly curved at their extremities. The center lines of the shaft 13, yoke 18 and axle 11 all lie in the same plane, the shaft thus being directly over the center of the axle when the engine is traveling on a tangent. Upon the end of each yoke arm is a fork 19 the arms of which extend over the axle 11 in spaced relation thereto and these fork arms further have their lower extremities parallel to act as guides for bushings 20 surrounding the axle 11 and provided with flanges between which the arms of the forks 19 engage so that the bushings are allowed to move up and down in the forks as the axle 11 moves up and down in its bearings. This construction makes provision for the constantly varying distance due to the inequalities of the track between the center line of the boiler and the front truck.

By means of this arrangement when the engine strikes a curve the front axle 11 is swung to one side to follow the curve and this causes the yoke 18 to swing substantially in unison therewith thus rotating the shaft 13 and causing the beam of light from the headlight 16 to be constantly directed along the track.

It will be noted that this device is simple in construction, of few parts and readily constructed and that there has thus been provided a novel and efficient device of the kind described and for the purpose specified.

Having thus described the invention, what is claimed as new, is:—

In a device of the kind described, the combination with an engine and its front axle; of a bracket fixed on the engine, a shaft rotatably mounted in the bracket, a headlight platform fixed on said shaft, a yoke attached to the lower end of said shaft, forks at the ends of said yoke engaged over said axle, and bushing on said axle and held in said forks for movement longitudinally thereof.

In testimony whereof, I affix my signature, in presence of two witnesses.

EPHRIAM B. POOLE.

Witnesses:
R. H. McNUTT,
R. A. MUSGROVE.